SIGNAL COUPLING AND TRAP NETWORK
Filed June 2, 1961
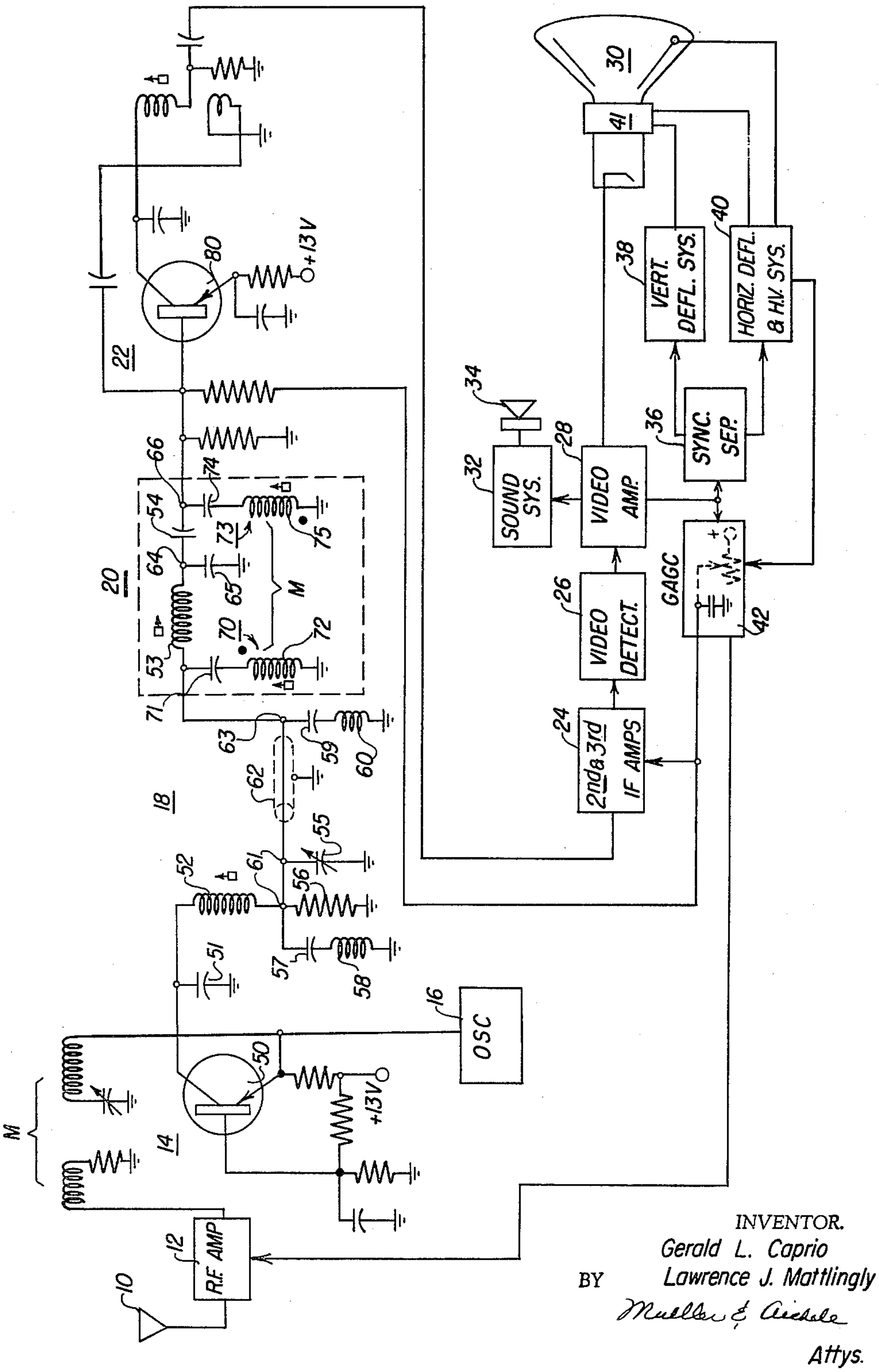
INVENTOR.
Gerald L. Caprio
Lawrence J. Mattlingly
BY Mueller & Aichele
Attys.

3,217,096
SIGNAL COUPLING AND TRAP NETWORK
Gerald L. Caprio, Carpentersville, and Lawrence J. Mattingly, Lombard, Ill., assignors to Motorola, Inc., Chicago, Ill., a corporation of Illinois
Filed June 2, 1961, Ser. No. 114,411
5 Claims. (Cl. 178—5.8)

This invention relates in general to an interstage coupling circuit and more particularly to a filter trap network useful for rejecting a relatively narrow band of frequencies in a transistor television receiver.

A composite television signal includes picture and sound information as well as line and field synchronization pulses which, in combination, occupies a relatively wide frequency range, approximately five megacycles. Interstage coupling networks must therefore exhibit band pass characteristics sufficient to accommodate the composite television signal as well as provide correct impedance matching characteristics between the associated stages of the television receiver.

Since, however, some channels of a television band are spaced relatively close in terms of frequency, a problem is presented in excluding certain adjacent channel interference signals, two of which are commonly known as "lower adjacent sound" and "upper adjacent video" signals.

In tube type receivers, a common method of providing the desired rejection of these interference signals has been the incorporation of a series-resonant circuit from a point intermediate in the coupling circuit to ground and tuned to trap out, or shunt, the undesired signals. In transistor applications, however, sufficiently high "Q" cannot generally be obtained with such a series-resonant circuit to provide the desired degree of interfering signal rejection without simultaneously altering the band pass characteristics of the interstage coupling circuit. Further, even disregarding the alteration of the band pass characteristics, the desired degree of attenuation cannot be obtained due to the low terminal impedances presented by transistors in general.

Accordingly it is an object of the present invention to provide a network within the direct signal path of an interstage coupling network to reject a relatively narrow band of undesired signal frequencies without materially attenuating other frequencies within the pass band range.

Another object of the invention is to provide an improved interstage coupling arrangement of the bandpass type in which a simple and expeditious means is provided for rejecting undesired or interfering signals.

A further object is to provide an interstage coupling circuit with an improved filter network which will reject interfering signals without altering the pass band characteristics of the coupling circuit.

Still another object is to provide a filter network in combination with an interstage coupling circuit for coupling transistor stages of a television receiver wherein undesired signals may be sufficiently attenuated despite the inherent low terminal impedances exhibited by the transistors.

A feature of the invention is the provision of a reactive interstage coupling circuit providing a signal path between transistor stages wherein a portion of the coupling circuit is interposed between the high potential terminals of a pair of series-resonant circuits having their low potential terminals connected to a common reference potential. The series-resonant circuits are mutually intercoupled whereby an alternate signal path is provided in shunt with the signal path through the portion of the reactive coupling circuit in reverse polarity to cancel a narrow range of frequencies determined by the resonant frequency of the series resonant circuits.

In the drawing, a partial block and schematic diagram is shown of a television receiver incorporating the present invention.

In practicing a specific form of the invention an interstage coupling circuit is provided between associated stages of a transistorized television receiver, such as converter and first intermediate amplifier stages, wherein a low loss filter trap is included as part of the coupling circuit to severely attenuate a narrow range of interference signals without materially affecting the remaining pass band range of the interstage coupling circuit. A pair of series-resonant circuits are connected from opposing terminals of a portion of the coupling network to ground. The portion of the interstage coupling circuit bridging the high potential terminals of the series-resonant circuits may be the secondary coupling coil and tuning capacitor of a double-tuned coupling circuit. The series-resonant circuits each include a capacitor and an inductor with the inductors having a mutual coupling therebetween to effectively provide an alternate signal path in shunt with the signal path through the secondary coupling coil. By further connecting the inductors of the series-resonant circuits in reverse polarity relation, a reverse phase shift is effected through the alternate signal path whereby a range of frequencies is cancelled within the pass band range of the interstage coupling circuit. The range of frequencies so rejected is determined by the tuning of the series-resonant circuits. Other frequencies in the pass band range of the interstage coupling circuit encounter minimum attenuation by reason of the very low virtual resistance of the secondary coupling coil and tuning capacitor.

Considering now FIG. 1 and the general operation of the television receiver, antenna 10 is connected to the radio frequency amplifier 12 which applies a received and selected signal to mixer stage 14. A local oscillator 16, generating a signal spaced by a fixed frequency from the frequency of the desired signal, is also coupled to mixer stage 14 in order to produce therefrom a signal of predetermined intermediate frequency, e.g., 45.75 megacycles. The converted carrier signal is coupled through interstage coupling circuit 18 and filter network 20 to intermediate amplifier 22. Further details of circuits 18 and 20 will be explained subsequently.

The converted signal is amplified in intermediate amplifier stage 22 and further amplified in subsequent intermediate amplifier stages indicated generally at 24. The amplified intermediate frequency signal is coupled to video detector circuit 26. Detector circuit 26 serves to demodulate the video carrier of intermediate frequency and this demodulated signal is applied to video amplifier 28 and from amplifier 28 to the cathode ray picture tube 30 for reproduction of the modulation information as the television image. The sound carrier is also derived from the video detector 26 and applied to the video amplifier 28. After amplification therein, the sound carrier is applied to the sound system 32 which provides further amplification and detection of the frequency modulation of this carrier. The sound system 32 includes a loudspeaker 34 for reproduction of the sound signal.

Video amplifier 28 is connected to the synchronizing signal separator 36 which separates the horizontal and the vertical synchronizing pulses from the detected composite video signal in order to control the vertical sweep system 38 and horizontal sweep system 40. The vertical sweep system 38 is connected to deflection yoke 41 disposed on the cathode ray tube 30 and applies a suitable sawtooth signal thereto in order to vertically scan the cathode ray beam of tube 30 and reproduce individual picture frames. The horizontal sweep system is likewise connected to yoke 41 for applying thereto a suitable sawtooth scanning signal for horizontal or line scanning of the cathode ray beam in tube 30 to produce the individual lines of the television picture in each frame. System 40 may further include suitable circuitry for producing the high voltage potential for the screen anode of tube 30.

The television receiver also includes a gated AGC system 42 to which the video amplifier applies a signal directly related to the strength of the received signal. The AGC system 42 may be gated by the horizontal sweep pulses developed in the horizontal sweep system 40 in accordance with known television practices. AGC system 42 applies a gain control potential developed therein to the intermediate amplifier stages including stage 22 and to the RF amplifier section 12 for reducing the gain thereof with increasing signal strength.

The foregoing general description of the television receiver of FIG. 1 is intended to indicate the overall operation of the illustrated receiver, the detailed operation of which will be known and understood by those skilled in the art and further elaboration is not believed necessary.

Turning now to a detailed consideration of interstage coupling circuit 18, the converted (45.75-megacycle) carrier signal from mixer stage 14 is developed at the collector electrode of transistor 50. Coupling circuit 18 may be of the bottom capacity coupled, double-tuned type having a primary winding 52, a secondary winding 53 and a capacitor 54 connected in series between the output collector electrode of transistor 50 and the input base electrode of transistor 80 of amplifier stage 22. Variable coupling capacitor 55 is connecter from the junction 61 of the primary and secondary windings to ground and is shunted by decoupling resistor 56.

The shielded cable 62 may be used to connect primary and secondary windings 52 and 53 since in a receiver of practical construction, the mixer is generally located at a point remote from the intermediate amplifying section such that shielding may be necessary to prevent extraneous signal pickup.

A capacitor 51 is connected from the high potential terminal of primary winding 52 to ground, forming therewith a parallel resonant circuit. Secondary winding 53 in series with capacitor 54 forms a series resonant circuit. A capacitor 65 is connected between the junction 64 of secondary winding 53 and capacitor 54 to ground in order to effectively raise the impedance level at this point for proper impedance matching characteristics.

In operation, interstage coupling circuit 18 must exhibit a pass band sufficient to accommodate the video, sound and synchronization signal components, approximately five megacycles. In addition, coupling circuit 18 must also present a proper impedance match between the output of mixer stage 14 and the input to first intermediate amplifier stage 22. The latter is particularly important in transistorized circuitry where relatively low input terminal impedances are presented by the associated transistors, on the order of ten to twenty ohms.

Since some of the television channels are spaced relatively close in terms of frequency, certain problems are presented by adjacent channel interference signals. For example, channel 3 has a 6-megacycle bandwidth from 60 to 66 megacycles and channel 4 likewise has a 6-megacycle bandwith from 66 to 72 megacycles. The video carrier of channel 3 is centered at 61.25 megacycles while the sound carrier is at 65.75 megacycles. Similarly the video carrier of channel 4 is at 67.25 megacycles with the sound carrier at 71.75 megacycles. It can be seen that only a 1.5 megacycle separation exists between the sound carrier of channel 3 and the video carrier of channel 4 while a 6-megacycle separation exists between the video carrier signals of channels 3 and 4.

To trap out the upper adjacent video interference signals, a series resonant circuit consisting of capacitor 57 and inductor 58 is connected from junction 61 and ground with an additional series resonant circuit consisting of capacitor 59 and inductor 60 connected between junction 63 and ground. Both series resonant circuits are tuned to 39.75 megacycles, representing the required 6-megacycle separation from the 45.75-megacycle converter signal developed at the output of mixer stage 14.

Such an arrangement, however, is not sufficient to attenuate the lower adjacent sound interference signal by reason of the relatively closer frequency proximity (1.5 megacycles) and the inherent low terminal impedances presented by transistors 50 and 80. Sufficient attenuation cannot be developed across such a series resonant circuit connected in shunt due to the practical limitations of the quality factor, or Q, presented by the associated inductance and capacitance thereof. Further the bandpass characteristics of the interstage coupling circuit 18 would necessarily be altered in an undesirable manner.

To provide for the rejection of the lower adjacent sound interference signals, band reject filter network 20 is provided wherein a series-resonant circuit 70 is connected between junction 63 and ground with an additional series-resonant circuit 73 connected between junction 66 and ground such that secondary coupling coil 53 and capacitor 54 effectively bridge the high potential terminals of the two series-resonant circuits. Inductors 72 and 75 have a small mutual coupling therebetween such that an alternate signal path is provided in shunt with the main signal path through secondary coupling coil 53 and capacitor 54. By connecting the polarity of inductors 72 and 75 in reverse phase relationship, the alternate signal path provides a signal at junction 66 which is 180° out of phase with the signal path through coupling coil 53 and capacitor 54 whereby a narrow band of frequencies is effectively cancelled. The band of frequencies so rejected is determined by the resonant frequencies of series resonant circuits 70 and 73. Initially, both circuits 70 and 73 are tuned to 47.25 megacycles to obtain the desired 1.5-megacycle frequency separation from the 45.75-megacycle conversion frequency of mixer 14. However, to compensate for the virtual resistance of coupling coil 53, the tuning of circuits 70 and 73 are alternately re-adjusted. Correct tuning is indicated by the sharp rejection band, or suck-out, in the bandpass range of interstage coupling circuit 18. In most instances, the tuning of series-resonant circuits 70 and 73 will be slightly stagger-tuned in the final "touch-up." The rejection bandwidth may be of the order of 10 to 40 kilocycles.

In a specific embodiment of the invention, it has been found that the following component types and values provide satisfactory results:

| | |
|---|---|
| Transistor **50** | type 4486 (Motorola). |
| Capacitor **51** | 8.2 micromicrofarads. |
| Coupling coil **52** | (tuned to 44.5 mc. with capacitor **51**). |
| Coupling coil **53** | (tuned to 44.5 mc. with capacitors **54** and **65**). |
| Capacitor **54** | 33 micromicrofarads. |
| Capacitor **55** | 220 micromicrofarads (nominal). |
| Resistor **56** | 680 ohms. |
| Capacitor **57** | 15 micromicrofarads. |
| Inductor **58** | (tuned to 39.75 mc. with capacitor **57**). |
| Capacitor **59** | 4.7 micromicrofarads. |
| Inductor **60** | (tuned to 39.75 mc. with capacitor **59**). |
| Capacitor **65** | 12 micromicrofarads. |
| Capacitor **71** | 8.2 micromicrofarads. |
| Inductor **72** | (tuned to 47.25 mc. with capacitor **71**). |
| Capacitor **74** | 8.2 micromicrofarads. |
| Inductor **75** | (tuned to 47.25 mc. with capacitor **74**). |
| Transistor **80** | 4454 (Motorola). |

Minimum mutual coupling is maintained between inductors 72 and 75 in order to effect an extremely high Q in the alternate signal path. In practice, inductors 72 and 75 may be physically displaced approximately 1¼ inches. High Q in the alternate signal path thus permits a relatively low resistance to be incorporated in the bridge arm interposed in the main signal path. In the embodiment of the invention, the inherent resistance presented by secondary coupling coil 53 is sufficient. It can be seen therefore that a substantially lossless filter network is provided since coupling coil 53 is already required to complete the requirements of interstage coupling circuit 18.

The invention provides, therefore, a simple and inexpensive filter as part of an interstage coupling circuit between stages of a transistorized television receiver wherein a narrow range of interference signals may be effectively rejected without materially attenuating other frequencies within the pass band range of the interstage coupling circuit despite the low terminal impedances inherent in transistors.

We claim:

1. In a transistorized television receiver the combination of a mixer circuit including a first transistor having a collector electrode, an intermediate frequency amplifier circuit including a second transistor having a base electrode, a parallel resonant circuit connected to said collector electrode, a series tuned circuit connected between said parallel resonant circuit and said base electrode, a first series resonant trap connected between one terminal of said series tuned circuit and a reference point, a second series resonant trap connected between another terminal of said series tuned circuit and the reference point, said first and second traps including respective inductors mutually intercoupled with a phase to translate signals of the trap frequency range around said terminals of said series tuned circuit for cancelling such signals as translated between said terminals.

2. In a television receiver having a tuned circuit tuned to a desired signal and connected between the output of a first stage and the input of a second stage, a filter trap for rejecting a relatively narrow range of frequencies and including in combination; a first series-resonant circuit connected between one terminal of said tuned circuit and a reference point, a second series-resonant circuit connected between another terminal of said tuned circuit and the reference point, said first and second series resonant circuits including respective inductors having a mutual inductive coupling therebetween to provide an alternate signal path in shunt with said tuned circuit, said inductors further having polarity connections such that the signal in said alternate signal path is reversed in phase with respect to the signal coupled through said tuned circuit whereby a range of frequencies is cancelled according to the resonant frequencies of said first and second series resonant circuits.

3. In a transistorized television receiver the combination of a mixer circuit including a first transistor having a collector electrode, an intermediate frequency amplifier circuit including a second transistor having a base electrode, a reactive interstage coupling circuit for coupling a composite television signal between said mixer circuit and said intermediate amplifier circuit, said coupling circuit including a parallel resonant circuit connected to said collector electrode and a series resonant circuit connected between said parallel resonant circuit and said base electrode, with a variable coupling capacitor connected between the interconnection of said parallel and series resonant circuits and a reference point, and band reject filter means for rejecting the lower adjacent sound signal within the pass band range of said interstage coupling circuit, said band reject filter means including a first series resonant trap connected between the interconnection of said paralleled resonant circuit and said series resonant circuit and the reference point and a second series resonant trap connected between the interconnection of said series resonant circuit and said base electrode and the reference point, said first and second traps including respective inductors mutually intercoupled to provide an alternate signal path in shunt with series resonant circuit, said first and second inductors being connected in reverse phase whereby signals of the trap frequency range may be cancelled across said series resonant circuit.

4. A coupling circuit for passing a desired signal and rejecting an undesired signal, including in combination, a tuned circuit tuned to maximize passage of the desired signal, said tuned circuit having a coupling inductor connected to conduct the desired signal through said coupling circuit with respect to a reference point, a first series resonant trap including a capacitor and a first inductor series coupled from one side of said coupling inductor to the reference point, a second series resonant trap including a capacitor and a second inductor series connected between the other side of said inductor and the reference point, said first and second traps being tuned to reject the undesired signal, and said first and second inductors being inductively mutually coupled with a phase relation to translate therethrough a portion of the undesired signal in an alternate path around said coupling inductor to substantially cancel that part of the undesired signal as conducted through said coupling inductor.

5. In transistorized signal translating apparatus for passing a desired signal and rejecting an undesired signal, the combination of a first transistorized stage having a first resonant circuit tuned to the desired signal, a second transistorized stage having a second resonant circuit tuned to the desired signal, reactance means interconnected between said first and second resonant circuits and connected to a reference point for coupling said tuned circuits, said second tuned circuit having a coupling inductor connected to conduct the desired signal between said first and second stages with respect to the reference point, a first series resonant trap including a capacitor and a first inductor series coupled from one side of said coupling inductor to the reference point, a second series resonant trap including a capacitor and a second inductor series connected between the other side of said inductor and the reference point, said first and second traps being tuned to reject the undesired signal, and said first and second inductors being mutually coupled with a phase relation to translate therethrough a portion of the undesired signal in an alternate path around said coupling inductor to substantially cancel the undesired signal as conducted through said coupling inductor.

References Cited by the Examiner

UNITED STATES PATENTS

| | | | |
|---|---|---|---|
| 2,025,128 | 12/35 | Rust | 325—489 |
| 2,183,741 | 12/39 | Grundmann | 325—489 |
| 2,270,416 | 1/42 | Cork et al. | 325—489 |

FOREIGN PATENTS

| | | |
|---|---|---|
| 107,118 | 4/39 | Australia. |

DAVID G. REDINBAUGH, *Primary Examiner.*

JOHN P. WILDMAN, ROY LAKE, *Examiners.*